United States Patent [19]

Pommer et al.

[11] Patent Number: 4,664,089
[45] Date of Patent: May 12, 1987

[54] FUEL SAVING APPARATUS

[76] Inventors: Fredi Pommer, Bogenstr. 1, 5630 Remscheid; Axel Blume, Kardinal-Schulte-Str. 14, 5069 Bensberg, both of Fed. Rep. of Germany

[21] Appl. No.: 677,368

[22] Filed: Dec. 3, 1984

[30] Foreign Application Priority Data

Dec. 3, 1983 [DE] Fed. Rep. of Germany ....... 3343797
Jun. 27, 1984 [DE] Fed. Rep. of Germany ....... 3423603

[51] Int. Cl.⁴ .............................................. F02B 23/00
[52] U.S. Cl. .................................... 123/585; 123/590; 48/180.1; 48/189
[58] Field of Search ............... 123/590, 585; 48/180.1, 48/189.3

[56] References Cited

U.S. PATENT DOCUMENTS 4,190,032 2/1980 Wright ................................ 123/590

FOREIGN PATENT DOCUMENTS

| 1991247 | 5/1968 | Fed. Rep. of Germany . |
| 6606241 | 9/1970 | Fed. Rep. of Germany . |
| 2321065 | 11/1974 | Fed. Rep. of Germany . |
| 2361505 | 6/1975 | Fed. Rep. of Germany . |
| 2612781 | 10/1976 | Fed. Rep. of Germany . |
| 2651308 | 5/1978 | Fed. Rep. of Germany . |
| 1560710 | 3/1969 | France . |
| 1004494 | 9/1965 | United Kingdom . |

*Primary Examiner*—E. Rollins Cross
*Attorney, Agent, or Firm*—Andrus, Sceales, Starke & Sawall

[57] ABSTRACT

A fuel saving device is described that comprises a mixer, a control, and a bypass air tap through a connection hose between the hose leading from the air filter to the crankcase and the hose leading from the air filter to the control. The mixer possesses a mixing orifice in the form of a hollow rod, that is formed as a triangular section provided with slits. An important feature is the tap of the bypass air out of the hose to the crankcase. With this tap particularly efficacious mixing proportions are obtained in the mixer with respect to a favorable preparation of the fuel-air-mixture.

18 Claims, 19 Drawing Figures

FUEL SAVING APPARATUS

The invention relates to a fuel-saving apparatus and to its design for operation with atomized and vapor forming fuels, that are treated in a mixer by means of a hollow rod provided with holes, whereby the mixer is arranged, for that purpose, in the discharge stream of a carburetor.

Fuel saving apparatuses have been widely developed in the art. They have, respectively, a double purpose, namely to make the operation of an automobile more rational and to reduce the environmental pollution from harmful substances.

It is possible with fuel saving apparatuses that are directed to improving the combustion process in the motor, in which the fuel vapor drops initially prepared in the carburetor are thereafter mixed with the combustion air through speed and deflection processes and through bypass air, to provide an atomization in the combustion chamber that approaches the ideal atomization. One strives to give optimal proportions to the combustion characteristic and combustion speed. When this occurs, fuel economy is the result as well as also a minimization of the vapor formed pollutants arising through a leaning out of the mixture.

It is thus known to achieve such an optimization through the amount of the supplied additional air to the carburetor of a motor in dependency on the amount of vacuum, whereby a control regulates the amount of the additional air in dependency on the increase of the vacuum that is present ahead of the throttle valve.

It is already known to realize such fuel saving apparatus for atomized fuels by means of a hollow rod arranged in a mixing space, whereby the mixer is arranged in the discharge stream of the carburetor and a hollow rod with holes is formed as the mixing orifice.

This apparatus however works unreliably, because the holes cannot bring about a reliable optimal mixing between the not yet completely prepared carburetor stream and the by-pass air. At this point, an optimization must come into play, even though the flow speed of the mixture to be combusted requires a very high mixing performance in the shortest time.

The object of the present invention is to provide this mixing performance with extremely high speed and extremely low time requirements, in the smallest space, through a special form of the hollow rod provided in the mixing space.

The invention achieves this object through a fuel saving apparatus that is suitable for already atomized (vaporized) fluid fuels as well as for gaseous fuels. For this it uses a hollow rod provided with holes that is arranged in the to be treated medium stream, specifically in the discharge stream of a carburetor and is characterized in that the hollow rod functions as a mixing orifice, whereby (a) the orifice inlet has a restriction,
(b) in the mixing element, a triangular section provided with slits is arranged
(c) slits are present on the inclined surfaces of the triangular section and
(d) all of the mixer parts are arranged in the mixing space.

In a further development of the invention, the axis of the hollow rod subtends an angle of approximately 20 degrees with the axis of the throttle valve.

Preferably, the profile section of the hollow rod is subdivided somewhat in half normal to the hollow rod axis so that the first half forms one inclined surface and the other half forms the other inclined surface. In this manner, the inclined surfaces are arranged angled to the direction of the medium stream, and the slits of one slit group are arranged angled to the slits of the other slit group.

Further configurations of the subject matter of the invention arise from the dependent claims.

This invention is described in detail in the following with the aid of exemplary embodiments in connection with the drawing. The drawings show.

In FIGS. 1–4, the mixing chamber is shown with the mixer 17 constructed in accordance with the invention in the form of a hollow rod 10 with slits 11. It is apparent particularly from FIG. 4 that the hollow rod is provided with inclined surfaces 13, 14 formed at an angle to each other, so that the thus formed triangle possesses a semi-circular base. Slit groups 15, 16, that are arranged angularly to each other, are arranged on the inclined surfaces 13, 14, on normals to the hollow rod axis. The hollow rod 10 and chamber-like edge surrounding it form the mixing chamber 18. The air supply to the hollow rod 10 is narrowed at 70 immediately ahead of the mixing chamber, so that there results, at this point, increased flow speed.

Figure 5:
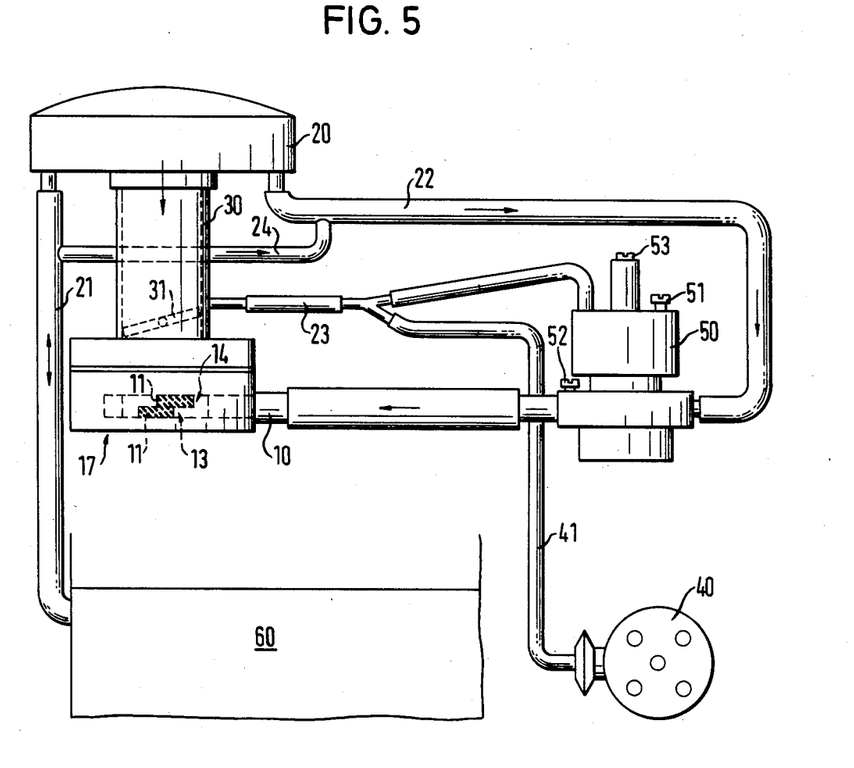
FIG. 5 is a schematic general view of the air filter, mixing apparatus, carburetor, control and engine block.

With the aid of FIG. 5, the coaction of the mixing chamber with the air filter 20, the carburetor 30, an ignition distributor 40 and a specially constructed control 50 for the by-pass air is explained. The air is inducted through the air filter 20 and the filtered air is supplied to carburetor 30 in which a customary throttle valve 31 is arranged. A hose 21 is mounted on the air filter 20 for the ventilation of the crankcase. Between the hose 21 and an intake hose 22 for the control 50, a connection is provided through a hose 24. A vacuum hose 23 leads from the carburetor 30 to the control 50, and by means of a T-piece, a further vacuum hose 41 leads to the ignition distributor 40.

In the hose 21 there is observed over a time interval, a vacuum with the descent of the pistons in the motor housing and a positive pressure with the ascent of the pistons. The invention uses this phenomena and taps the hose 21 for the bleeding of the bypass air. This occurs through hose 24 that forms a direct connection, narrower in cross section, between the hose 21 and the control 50, the intake hose 22 of which leads from filter 20 to control 50.

The result achieved through the arrangement of this connection hose 24 is surprising and out of the ordinary. In test experiments with Citroen vehicles, there resulted a fuel saving on the average of 15 to 20%.

The surprising extra advantage arises from a reduction of the injurious discharges; with respect to NOX about 30%, CH 45% and CO about 70%.

The invention accounts for these unusual values in that the pneumatically pulsing air stream between crankcase 60 and hose 21 contains oil vapors in the form of a mist. This also explains the known occurence of the oil fouling of parts of filter 20.

It is clearly apparent from the invention that the deposit of the oil mist after installation of the connection hose 24 ceases or vastly diminishes. That can only mean that the connectio hose 24 conveys considerable portions of the oil mist in the suction hose 22 leading to the control 50. From there, the so enriched and emerging air mixture arrives in the mixer 17; that is, that in the mixer there can arise a highly treated fuel mixture from the mixture of initially prepared carburetor fuel with a mixture of clean air from the filter and the oil mist enriched air from the connection hose 24, that remains favorable combustion characteristics.

Figure 6:
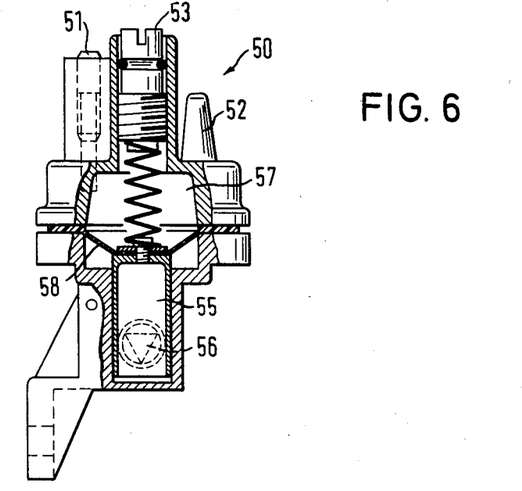
FIG. 6 is a section through a control.
Figure 7:
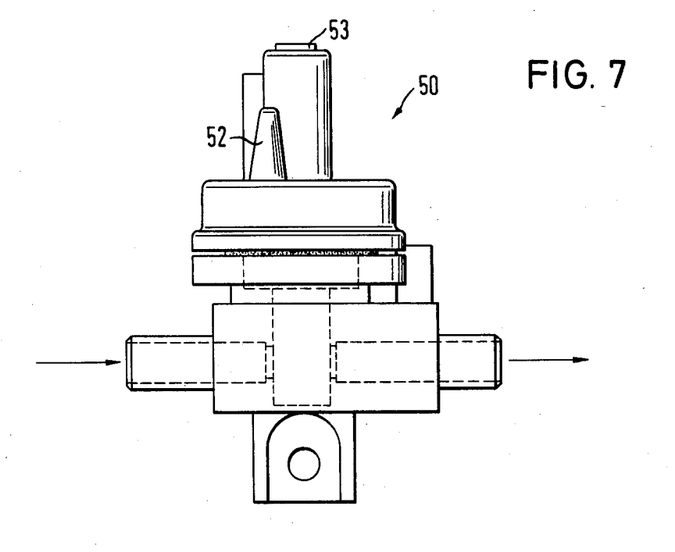
FIG. 7 is a side view of the control in FIG. 6.
Figure 8:
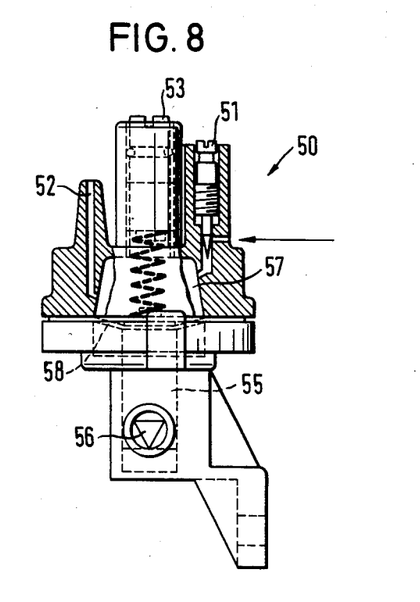
FIG. 8 is a further section through the control with a vacuum connection and bypass governor.

The control 50 for the bypass air has, as the group of FIGS. 6 through 8 shows, a bypass control 51 an idle control 52, a pressure regulating screw 53 for the regulating piston 55, a supply conduit to the control, and a discharge conduit to hollow rod 10, whereby the supply conduit in cross section is triangularly formed, as indicated by 56. The piston 55 is formed as sliding piston 56. The control has a membrane chamber 57. The membrane 58 is spring loaded.

Figures 1, 2:
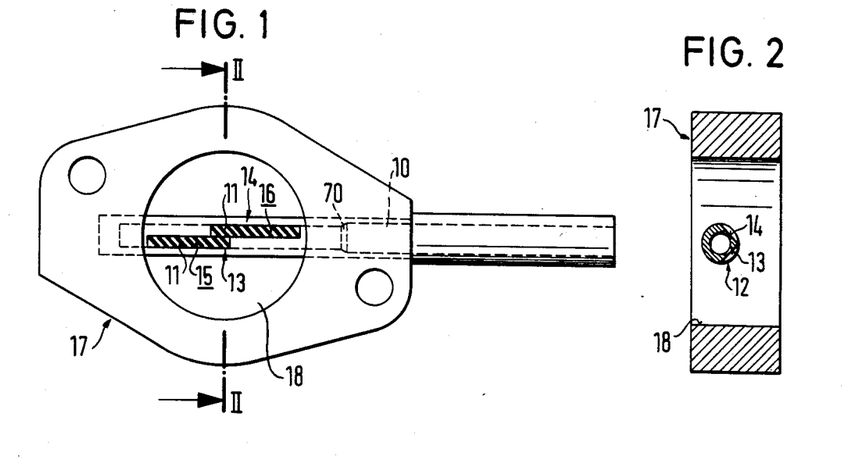
FIG. 1 is a plan view of the mixing chamber and hollow rod.
FIG. 2 is a section through the FIG. 1.
Figure 3:
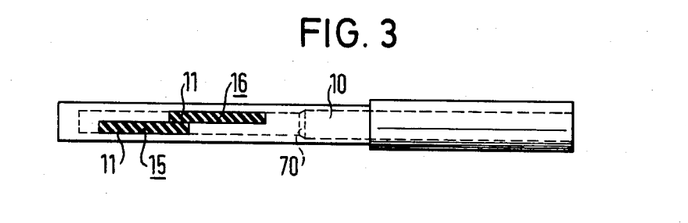
FIG. 3 shows the hollow rod with the slit arrangement in plan view.
Figure 4:
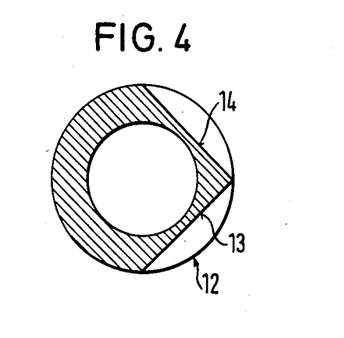
FIG. 4 shows a section through FIG. 3 with the inclined surfaces.

The mode of operation of mixer 17 is characterized as a pneumatic action in the mixing chamber 18 with a double action toward two sides. Both flow branches meet with the intake gas one against the other. Thus on account of the very small space, high turbulence is produced. This high turbulence makes the device according to the invention also suited as a particularly effective mixer for the treatment of gases. It is apparent that the existing mixing chambers according to the state of the art provide no ideal mixing of gas and air, so that the insertion of mixer 17 brings about considerable improvement, not only with respect to a better utilization of the fuel, but also an increasedly more favorable working utilization of the combustion gases resulting in a considerable reduction of pollutants.

In FIGS. 1 through 19 a further exemplary embodiment of the invention is described. This possesses improvements and spatial alterations both in hollow rod 10 with its attachment as well as also in control 50.

Figure 9:
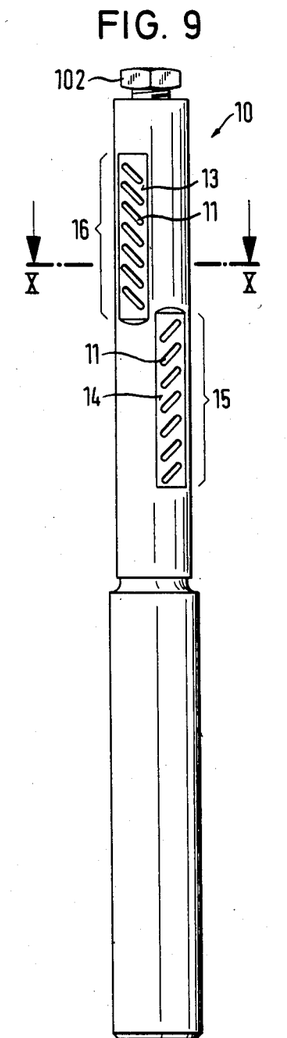
FIG. 9 is a plan view of a hollow rod in a further exemplary form with an oppositely running slit arrangement.
Figure 10:
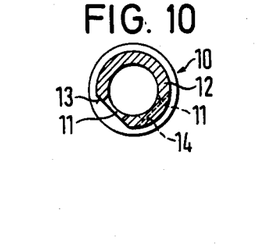
FIG. 10 is a section along the line X—X of FIG. 9.

In this connection, the groups of slits 15, 16 of the orifices-hollow rod 10 with respect to angulation to the longitudinal axis of the orifices-hollow rod section 12 would, in this way, be improved, in that these are no longer arranged parallel to each other but are arranged angularly to each other. It has been discovered with further tests that this arrangement according to the invention provides an improvement of the mixing performance.

Figure 11:
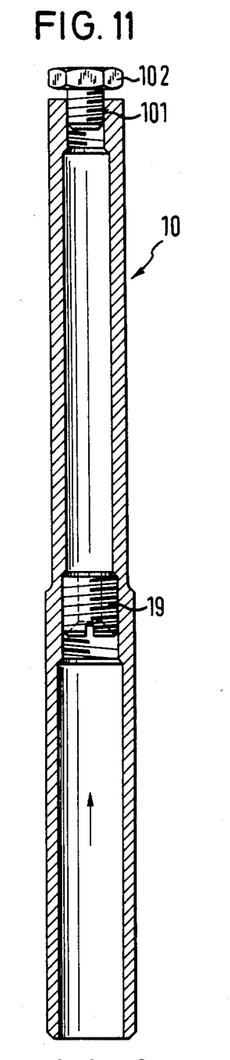
FIG. 11 is a longitudinal section through the hollow rod of FIG. 9 with a reducing element.
Figure 12:
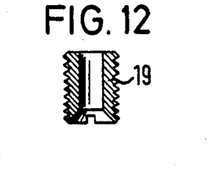
FIG. 12 shows the reducing element of FIG. 11 in section.

Further, there could be arranged a reducing insert 19 in the orifices-hollow rod interior that considerably improves the arriving gas mixture ahead of the slit groups 15, 16. Finally, a threaded bore 101 is arranged in the end of the orifices-hollow rod 10 that permits a simple installation and disassembly owing to the fact that a fastening screw 102, according to FIG. 12, upon tightening, locks fast the position of the orifices-hollow rod 10 and with loosening of the screw, allows the removal of the hollow rod, for example, for maintenance purposes, quickly and effortlessly.

Figure 13:
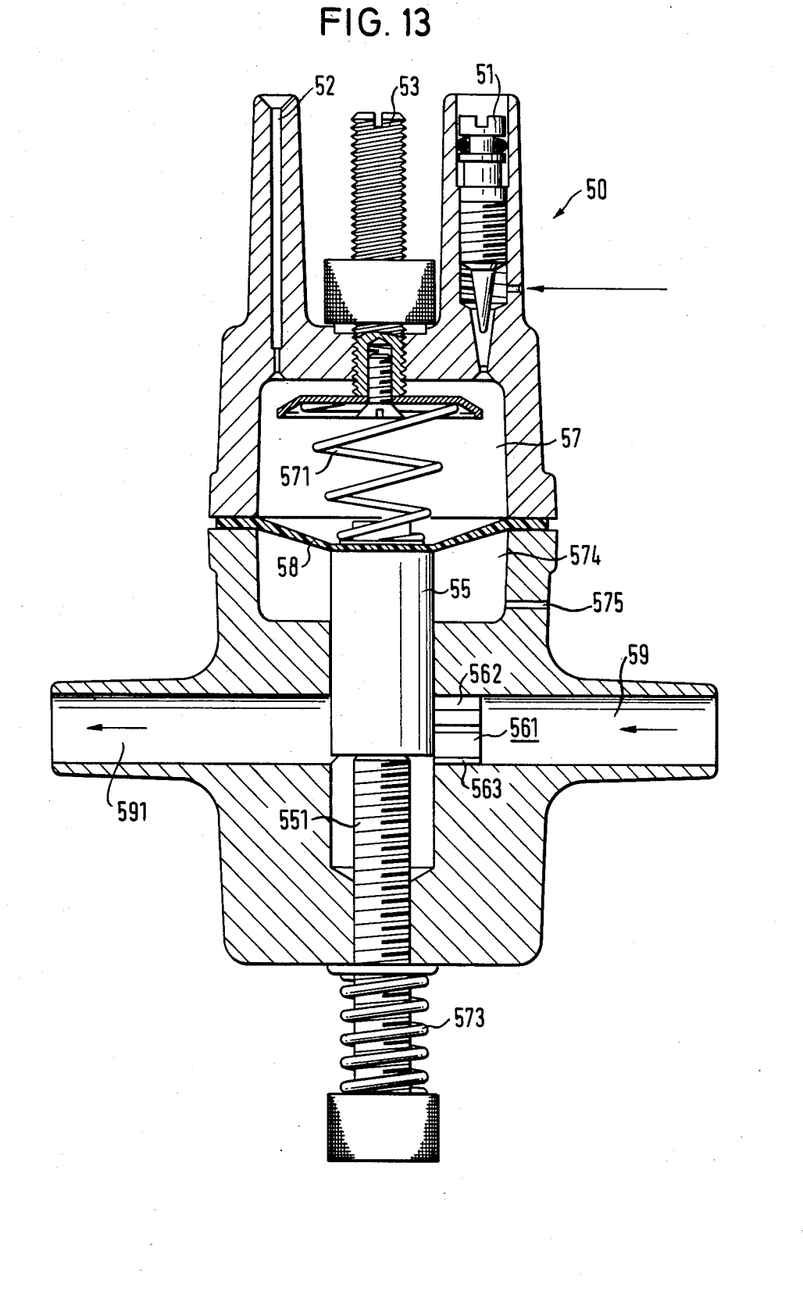
FIG. 13 is a section through a control of a further embodiment.
Figure 14:
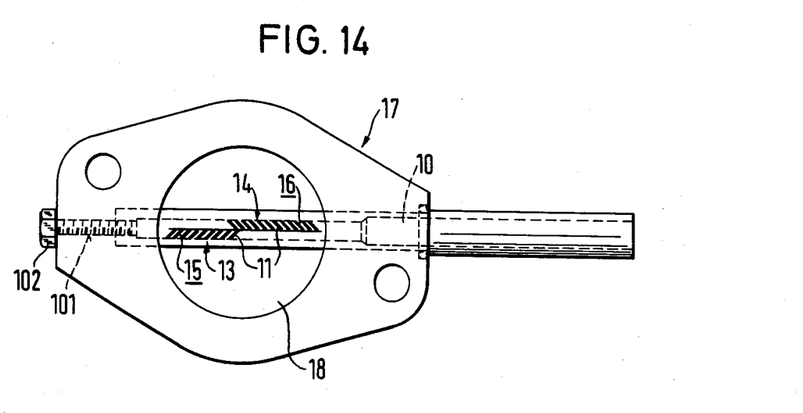
FIG. 14 is a view of the mixer housing of the embodiment of FIG. 8 with a hollow rod.
Figure 15:
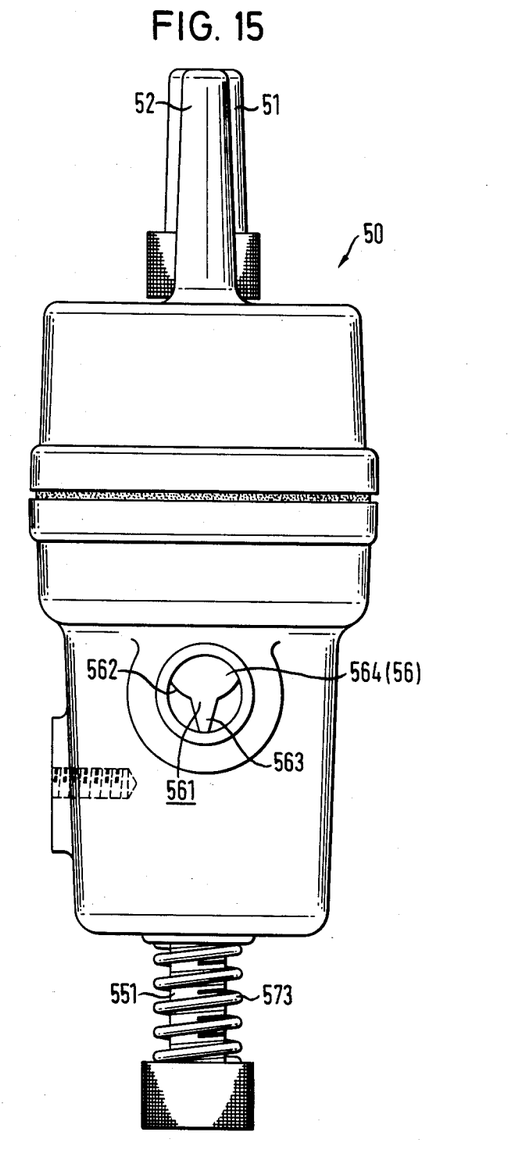
FIG. 15 is a view of the control of FIG. 13.
Figure 16:
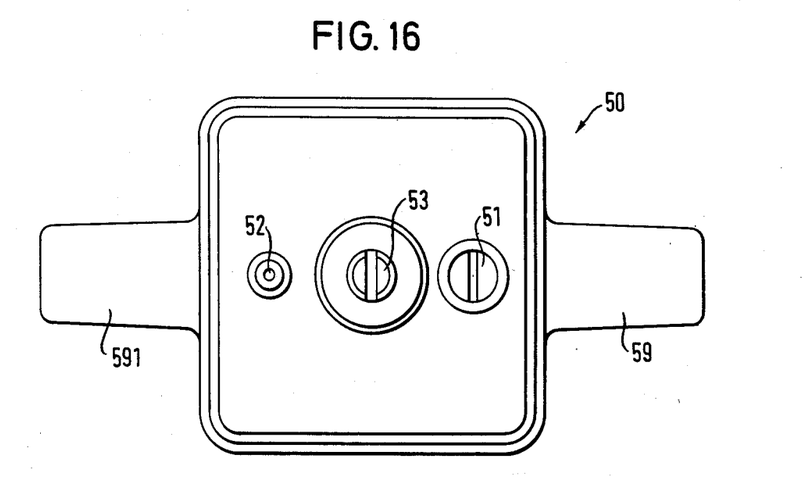
FIG. 16 is a plan view of the control of FIG. 15.
Figure 17:
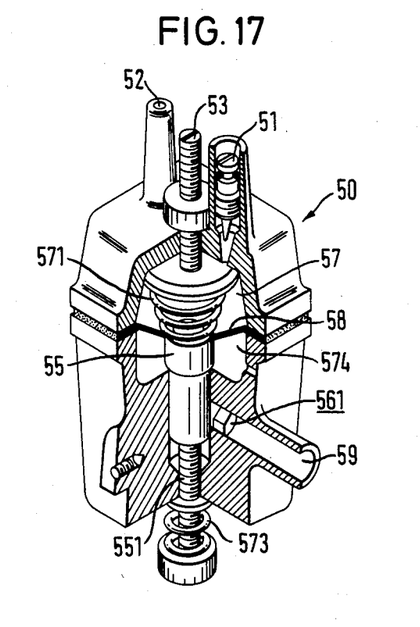
FIG. 17 is a perspective view of the control of FIG. 13 with a quarter section removed.

The improvements in control 50 apply in the area of piston 55 and the stop and stroke limiting screw 551, that stands under the pressure of a retaining spring 573. Through this, the screw is locked.

A spacer body arranged in the air supply bore 59 contributes to the functioning of sliding piston 55. This spacer body 561 is arranged in the air intake 59. The spacer body has, in the upper part 562, a cylindrical form so that the opening cross section 564 parallel to the axis to the air inlet 59 is formed with its surrounding round cross section, and is, in the lower part 563, formed pointedly.

Figure 18:
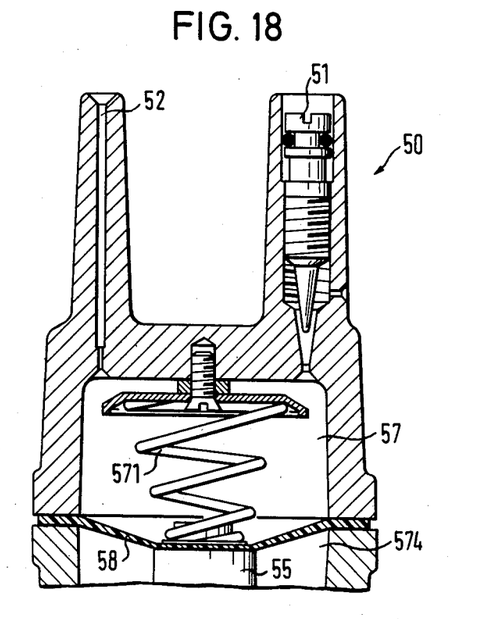
FIG. 18 is a section through the regulator of FIG. 13.
Figure 19:
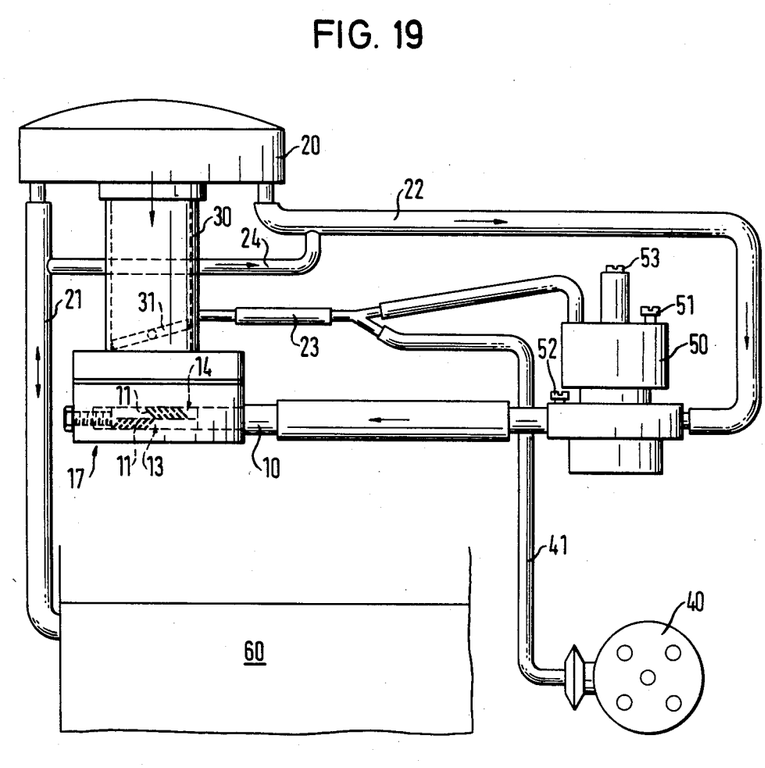
FIG. 19 is a schematic view of the engine compartment with the individual elements.

In the overall operation of regulator 50, the sliding piston 55 and the spatial form 561 of the triangular passage coact in a restricting manner. Under full control, the triangular passage prevents a choking of the motor and effects a slow supply flow to the control 50 in the direction of the air outlet 591.

The relatively narrow bore 52 to the open side of membrane chamber 57 and the supply air bore 575 in the lower space 574 of the membrane chamber serve for the purpose of comparison. As a matter of general principle, the accommodation of the respective motor types results through the bypass control 51.

We claim:

1. Apparatus for supplying supplemental air to an internal combustion engine having a carburetor arranged in an intake passage for the engine, said apparatus comprising a hollow rod (10) inserted in the intake passage downstream of said carburetor and transverse to the passage, one end of said rod being connectable to a source of supplemental air, the other end of said rod being positioned in said intake passage and having a pair of flat surfaces (13, 14) inclined to each other to provide a generally triangular cross-sectional configuration to said rod, a plurality of parallel slits (11) arranged on each of said inclined surfaces for discharging supplemental air into the intake passage, said rod having an orifice restriction (70) upstream of said pluralities of slits.

2. The apparatus according to claim 1 wherein the intake passage has a flow direction therealong and wherein said inclined surfaces are angularly arranged with respect to the flow direction of the intake passage.

3. The apparatus according to claim 1 wherein said plurality of slits on each of said inclined surfaces are arranged at an angle to the axis of the hollow rod.

4. The apparatus according to claim 1 wherein said plurality of slits (15) on one of said inclined surfaces is arranged at an angle to the plurality of slits (16) on the other of said inclined surfaces.

5. The apparatus according to claim 4 wherein said plurality of slits (15) on one of said inclined surfaces is arranged at an acute angle with respect to said plurality of slits (16) on said other inclined surface.

6. The apparatus according to claim 3 wherein said plurality of slits (15) on one of said inclined surfaces is arranged at an angle to the plurality of slits (16) on the other of said inclined surfaces.

7. The apparatus according to claim 1 wherein said hollow rod has a half round base connecting said inclined surfaces with each other.

8. The apparatus according to claim 1 wherein said orifice restriction comprises a removable reducing insert (19) arranged in said hollow rod.

9. The apparatus according to claim 1 wherein said other end of said hollow rod contains a threaded bore (101) for receiving a fastening screw (102) for mounting said rod in said intake passage.

10. The apparatus according to claim 1 further including a control means (50) intermediate said hollow rod and the source of supplemental air for controlling the supply of supplemental air.

11. The apparatus according to claim 1 further defined as one for supplying supplemental air to an internal combustion engine having a crankcase housing (60), an air filter (20) in the intake passage, and a first conduit (21) between said air filter and crankcase housing, said apparatus including a second conduit (22) between said air filter and said hollow rod for supplying the supplemental air, control means (50) in said second conduit for controlling the supply of supplemental air, and a hose (24) intermediate said first conduit and said second conduit for connecting said first and second conduits.

12. The apparatus according to claim 10 wherein said control means (50) comprises a body having a passage (59) for supplemental air to said hollow rod, a chamber (57) in said passage, a piston (55) movable in said chamber for occluding said passage to control the supply of supplemental air through said control means, said spring means (571) and membrane means (58) in said chamber for moving said piston.

13. The apparatus according to claim 10 wherein the intake passage has a vacuum line (23) leading therefrom, said vacuum line being connectable to said control means, said spring means and membrane means being operable by pressures in said vacuum line.

14. The apparatus according to claim 13 wherein said control means body further includes a controllable air inlet port means (51) bypassing the vacuum provided by said vacuum line, a pressure regulator (53) for said piston, and an idle control means located in said passage.

15. The apparatus according to claim 13 wherein said membrane means (58) divides said chamber with said piston on one side thereof, said chamber having a vent (575) in the side containing said piston.

16. The apparatus according to claim 12 wherein said passage is triangular (561) in cross section.

17. The apparatus according to claim 16 wherein said triangular passage is defined by a ball formed upper part (562) and an acutely angled part (593).

18. The fuel saving apparatus according to claim 12 wherein the mechanical properties of said spring means and membrane means are coordinated with the anticipated power rating of said engine.

* * * * *